Patented Feb. 5, 1924.

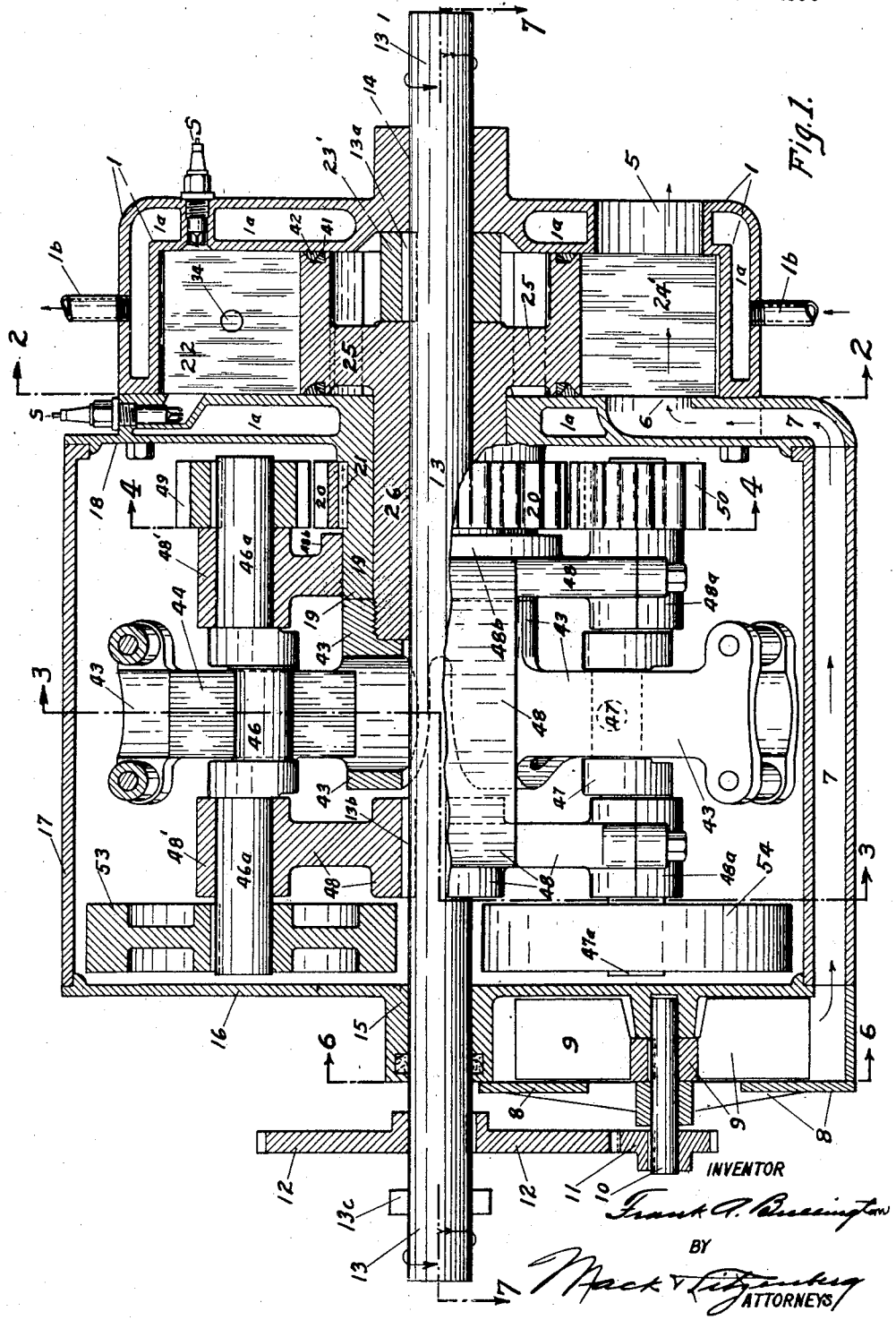

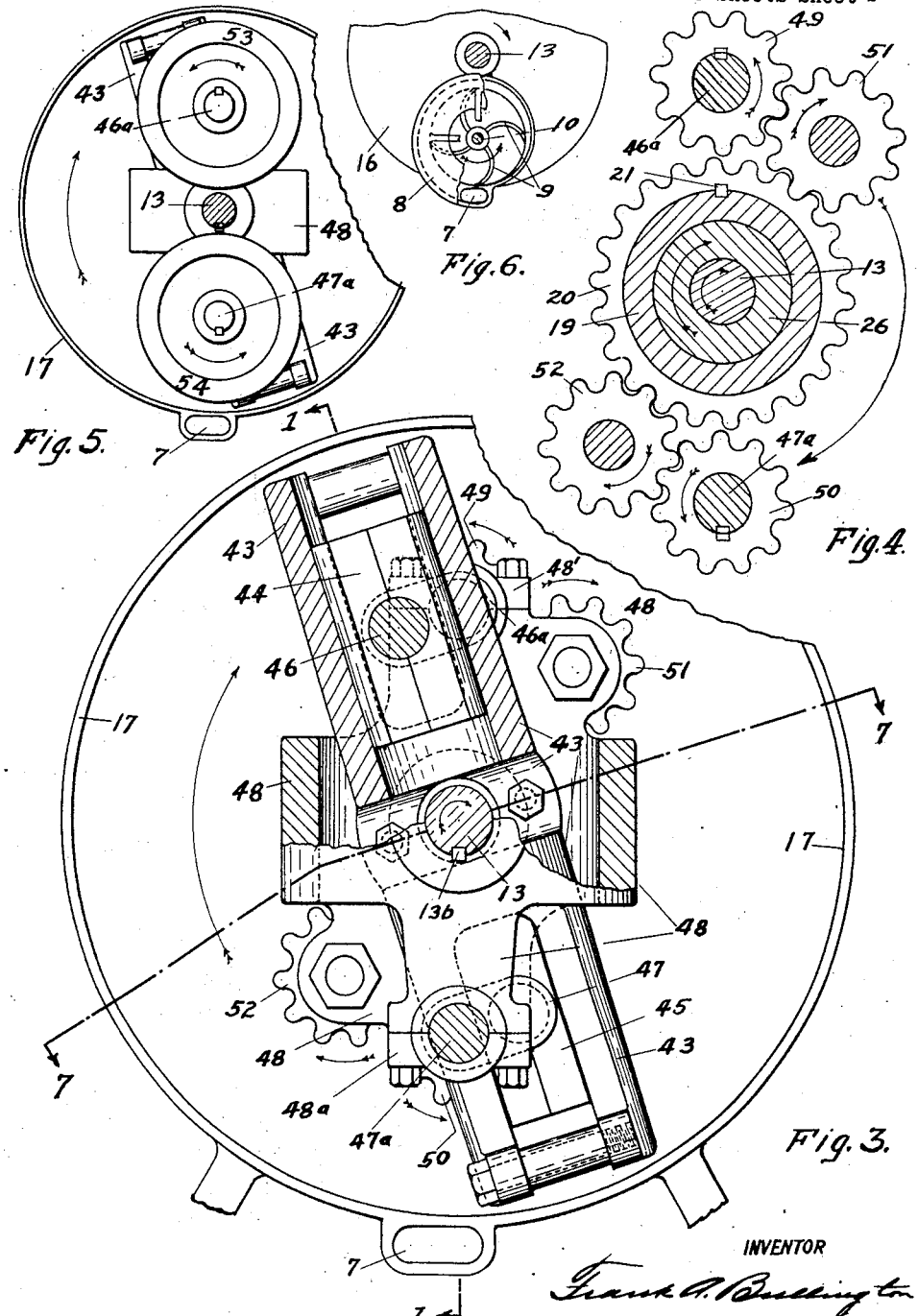

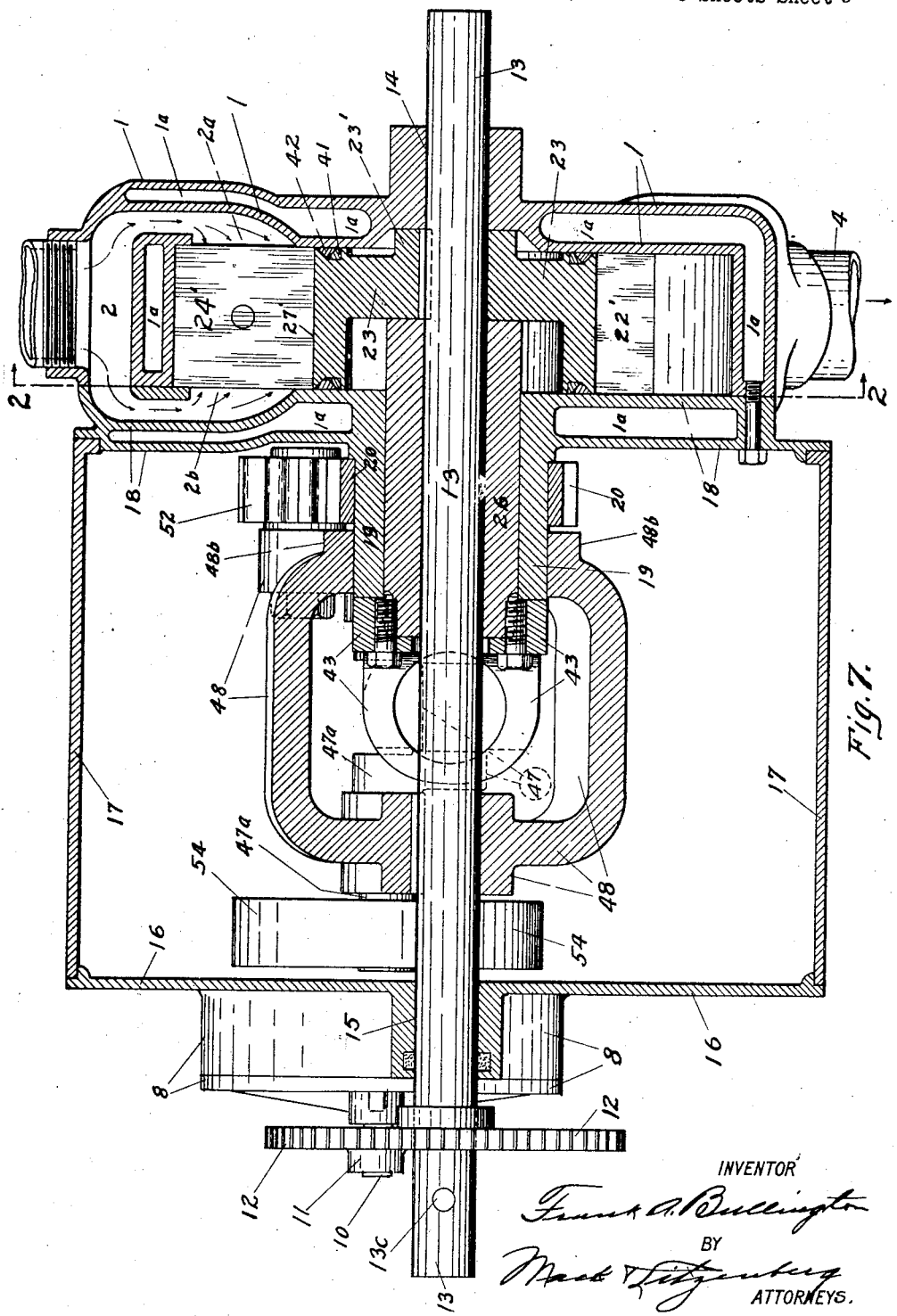

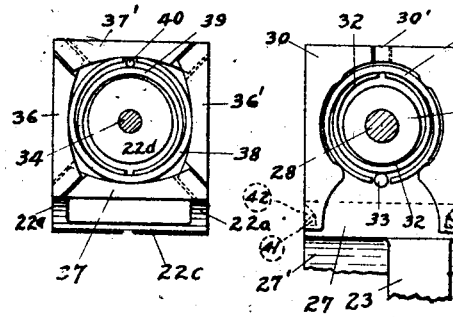
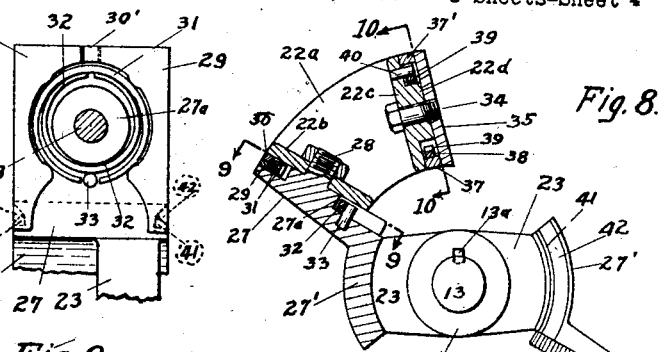
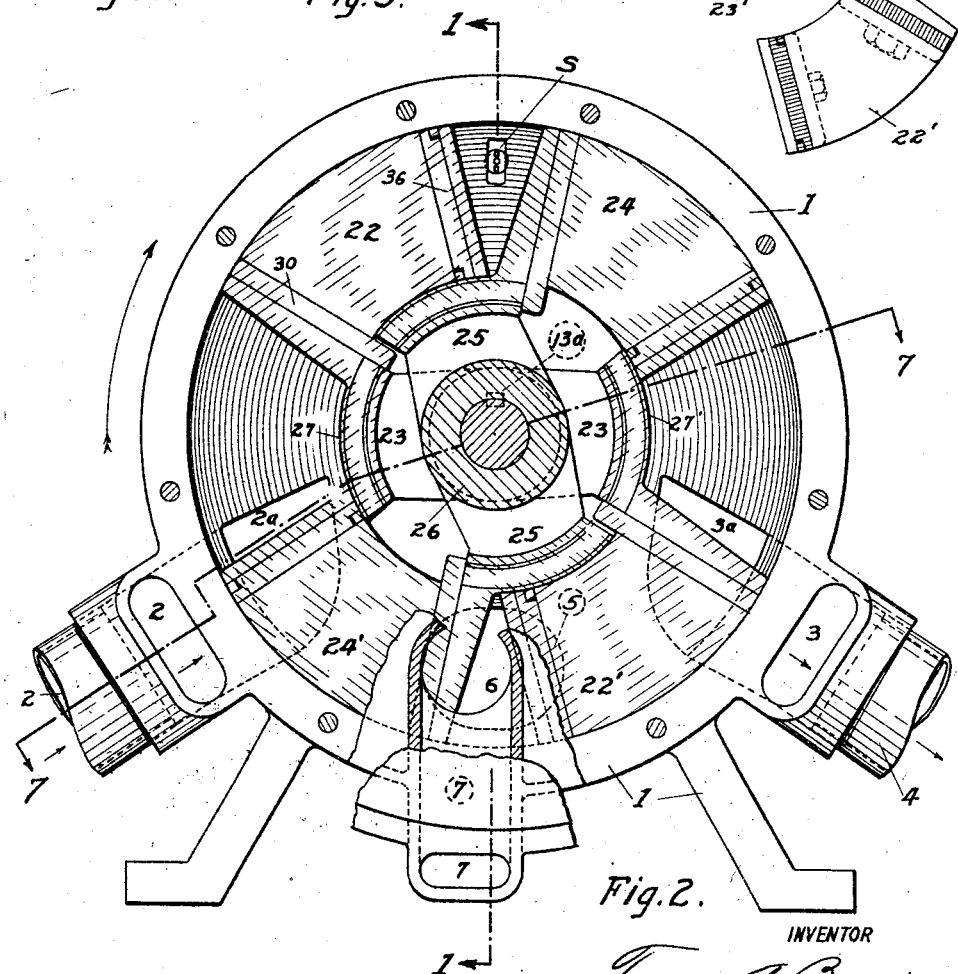

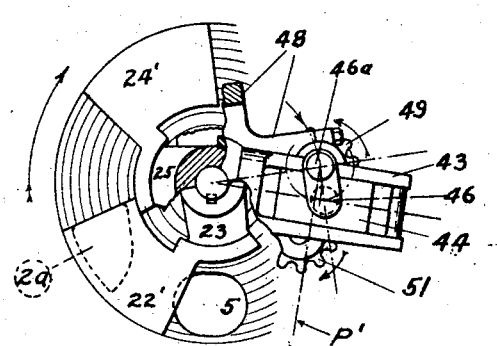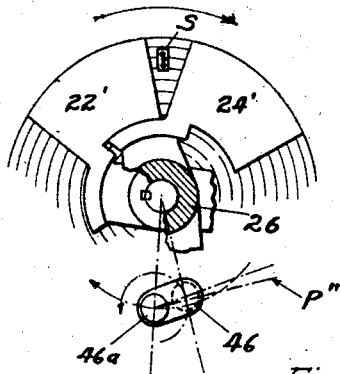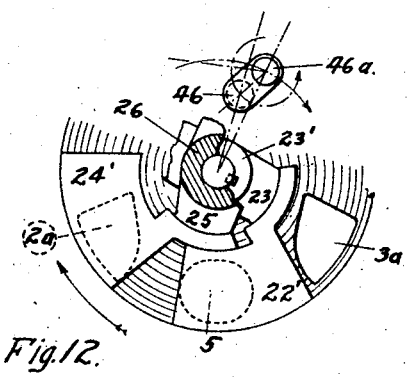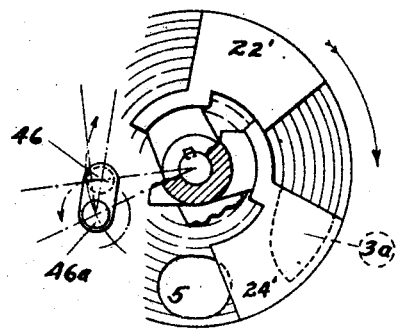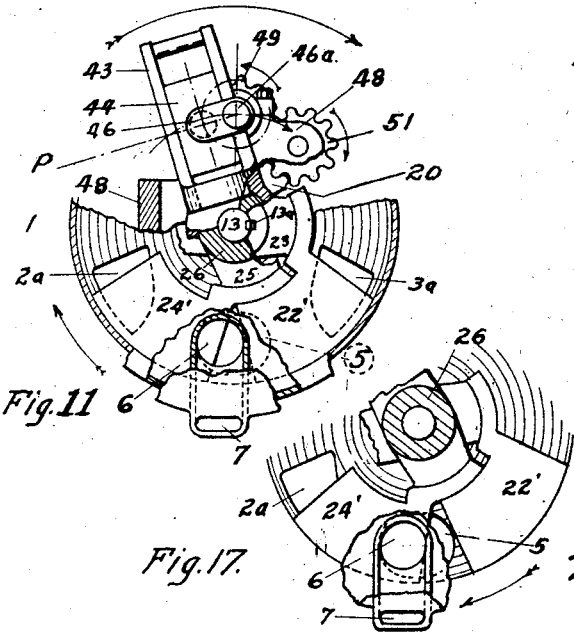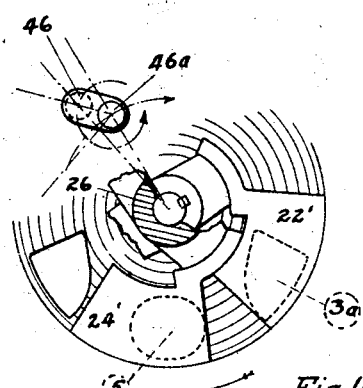

1,482,627

UNITED STATES PATENT OFFICE.

FRANK A. BULLINGTON, OF KANSAS CITY, MISSOURI.

ROTARY INTERNAL-COMBUSTION ENGINE.

Application filed June 17, 1918, Serial No. 240,443. Renewed April 30, 1923.

*To all whom it may concern:*

Be it known that I, FRANK A. BULLINGTON, a citizen of the United States, residing in Kansas City, county of Jackson, and State of Missouri, have invented certain new and useful Improvements in Rotary Internal-Combustion Engines, of which the following is a specification.

It is well known that the principal objection to rotary combustion engines so far developed has been the low efficiency thereof, due to the fact that the functioning chambers have been so imperfectly sealed; that the operating mechanisms thereof themselves absorb a large percentage of the power developed; and that a perfect exhaust and scavenging action has not yet been produced, which results in an imperfect charge of explosive mixture.

Among the salient objects of my invention are,—to provide a rotary combustion engine having a higher degree of efficiency than has yet been secured. I accomplish this by providing a construction in which the functioning chambers are more perfectly sealed at all times; by providing a construction in which one set of pistons has a uniform continuous rotating movement forwardly and another co-operating set of pistons which has a varying rotating movement forwardly; by providing a construction in which the larger number of the moving parts and those constituting the bulk of the weight of the moving parts, move with the uniformly moving set of pistons and assist in maintaining said uniform forward movement, while a lesser number of moving parts, of minimum weight, are connected to move with the pistons having a varying rotating movement forwardly; by providing a construction in which a fly wheel is included with the moving parts which move with the uniformly moving pistons and itself contributes to assist in maintaining and controlling said uniform forwardly rotating movement; by providing a construction in which I not only secure a perfect exhaust and scavenging action, but in which I am able to supply a charge of pure air to the chamber prior to the intake of the gas mixture, which, combined with said gas mixture, forms a perfect explosive mixture. In accomplishing this latter step, I provide a rotary gas engine having five steps to its cycle of operation, or, in other words, a five cycle engine. I have also increased the efficiency of my engine by a construction in which it is possible to provide intake and exhaust openings of such size relative to the volume of the chambers that a more perfect intake and exhaust action is possible. This is made possible by the form of piston used. I also provide a construction in which it is possible to place the intake and exhaust ports in the sides of the cylinder casing, thus making it possible to use two intake ports of comparatively large area through the opposite sides of the cylinder casing and directly opposite each other, with the same arrangement for the exhaust ports.

In order to explain my invention, I have shown on the accompanying drawings, for purposes of illustration, one practical embodiment thereof, which I will now describe.

Figure 1 is a vertical, longitudinal sectional view, taken on line 1—1, of Fig. 2;

Figure 2 is a transverse sectional view thereof, taken on line 2—2, of Fig. 1;

Figure 3 is a transverse sectional view taken on line 3—3, Fig. 1;

Figure 4 is a transverse sectional view taken on line 4—4, Fig. 1;

Figure 5 is a reduced end view of the crank case shown in Fig. 1, with the end of the casing removed;

Figure 6 is a detail view showing an air blower, in connection with the air passageway, and seen at line 6—6, of Fig. 1;

Figure 7 is a horizontal sectional view taken on line 7—7, of Figs. 1, 2 and 3;

Figure 8 is a detail of one of the pistons, partly in section;

Figure 9 is a sectional view of said piston, taken on line 9—9, of Fig. 8;

Figure 10 is a similar view, taken on line 10—10 of said figure;

Figures 11, 12, 13, 14, 15, 16 and 17 are fragmentary diagrammatical views showing the different successive positions of the pistons relative to each other and in relationship to the crank and to the intake and exhaust and scavenging ports.

Referring now more in detail to the drawings, my engine as here shown, comprises a cylinder casing 1, having a water jacket 1ª, with water pipes 1ᵇ, 1ᵇ, leading thereto. A main inlet port 2 is shown, divided so as to lead to the opposite sides of the cylinder casing, through which sides port openings 2ª and 2ᵇ, opposite each other, are provided, as clearly shown in Fig. 7 and indicated in Fig. 2. A similar exhaust port 3 is provided in the periphery of said cylinder casing, which is also divided to communicate with the opposite sides of the cylinder casing, through which exhaust ports or openings 3ª and 3ᵇ are provided. Connected with the exhaust port is an exhaust pipe 4, shown in Fig. 7. Also provided through the outside of said cylinder casing, is an auxiliary exhaust port 5, opposite which and through the opposite side of said cylinder casing is an air supply port 6, with which communicates an air passageway 7, leading from the blower casing 8, in which is an air blower 9, on a shaft 10, provided with a pinion 11, driven from a gear 12, on a main shaft 13. Said main shaft has a bearing at one end at 14, in the outside of the cylinder casing, with another bearing at the opposite end of the engine, in an end plate 16, of the crank casing 17. Said crank casing is secured to the side plate 18 of the cylinder casing 1, as clearly shown in Fig. 1. Formed as a part of said side plate 18, is a hub extension 19, provided with a gear 20, keyed thereto, as at 21. Mounted on the main shaft 13, within the cylinder casing are two pairs of pistons, one pair of which, designated 22 and 22′, are secured to the opposite ends of an arm 23, having a hub 23′, keyed to the main shaft 13, at 13ª, as shown in Figs. 1, 2 and 7, and in detail in Fig. 8. The other pair of pistons, designated 24 and 24′ are secured to the opposite ends of an arm 25, having a sleeve 26, mounted on the main shaft 13, as shown in Figs. 1, 2 and 7.

I will next describe the construction of these pistons, referring especially to Figs. 8, 9 and 10, in which pistons 22 and 22′ are shown. Each of the pistons comprise a hollow shell, the side walls 22ª and 22ª of which are of segmental form, with the end walls 22ᵇ and 22ᶜ. End wall 22ᵇ is secured to a piston head 27, by means of a bolt 28, said piston head having an extension lip 27′, by means of which it is secured to the arm 23, said extension lip 27′, in each case, underlying the body of an adjacent piston, as clearly shown and as hereinafter again referred to. The inner face of the piston head 27 is provided with a circular extension 27ª, providing an annular space between said piston head and the end wall 22ᵇ of the piston body, around which are placed sealing members 29 and 30, having overlapping relationship with each other, as at 30′. These sealing members bear at their outer opposite edges against the opposite side walls of the cylinder casing, and at their outer edges against the outer wall of said casing, and are yieldingly moved by means of two expansion rings 31 and 32. Expansion ring 31 is set so as to cause lateral or sidewise movement of the sealing members 29 and 30, while expansion ring 32 has a bearing upon a stud 33, whereby its upper ends, bearing upwardly and outwardly against the outer ring 31, tend to move the sealing members radially outwardly.

The outer end wall 22ᶜ of the piston body is also formed to provide a circular extension 22ᵈ, aand has secured thereto, by means of a bolt 34, an outer plate 35. Mounted between said plate 35 and the end of the piston body, are four sealing strips 36, 36′ and 37, 37′, overlapping each other at their corners, as shown, and adapted to be forced outwardly into bearing relationship with the walls of the cylinder casing by means of expansion rings 38 and 39. The outer expansion ring 38 operates normally to force the four sealing strips outwardly. When the engine is running, the centrifugal force tends to throw the inner sealing strip 37 and the expansion ring 38 outwardly, but this action is overcome by the action of expansion ring 39, which bears against the stud 40, at its middle portion, while its inner ends bear against the inside of expansion ring 38. Thus I have provided means whereby a perfect sealing action is secured, whether the engine is running slow or fast. Expansion and sealing rings 41 and 42 are also provided in each side of the extension lip 27′.

It is to be understood that these pistons are substantially alike, one pair being mounted directly on the main shaft, and turning therewith, and having a uniform, continuous forward rotating movement, and hereinafter referred to as the "uniform" pistons, while the other pair of pistons is provided with a sleeve 26, which turns on said shaft, at varying speed forwardly relative to the speed of the first mentioned pistons, and are hereinafter referred to as the "varying" pistons.

The piston sleeve 26, has a bearing in the hub 19, formed as a part of the crank case plate 18. Secured to the end of said piston sleeve 26, is a transversely extending cross slide member 43, which revolves with said sleeve 26, about the axis of the main shaft 13, cross slide member 43 having slidably mounted therein two sliding crank bearing members 44 and 45, connected with cranks 46 and 47. Keyed to the main shaft 13, as at 13ᵇ, to turn therewith is a crank shaft carrying member or shell, 48, having two bearing boxes 48′, 48′, at its upper side, as shown, to receive the crank shaft 46ª, and similar bearing boxes at its lower side, designated 48ª, 48ª, to receive the crank shaft 47ª. Said crank shaft carrying member 48 is also provided at one side with a hub portion 48ᵇ, whereby it is supported upon the hub extension 19 of the casing plate 18, and upon which hub extension 19, said crank shaft carrying member turns. Keyed to the inner ends of the crank shafts 46ª and 47ª, are gears 49 and 50, which mesh with intermediate gears 51 and 52, which in turn mesh with fixed hub gear 20, as clearly shown in Fig. 4. Keyed to the outer ends of said crank shafts 46ª and 47ª, are balance or fly wheels 53 and 54.

From the foregoing description, it will be evident that as the main shaft 13 and the crank shaft carrying member 48, keyed thereto, are revolved about the axis of said shaft, in the direction indicated by the arrows on Figs. 1 and 3, that the crank shafts 46ª and 47ª are also turning about their own axes, in the direction shown, by reason of the gear connection to the fixed gear 20, and that the cross slide member 43 is being oscillated by said cranks, and is also being revolved about the axis of the main shaft 13 by said cranks. In other words, the cranks 46 and 47 oscillate said cross slide member 43 and also revolve it about the main shaft. This is the action in starting the engine, as by turning the main shaft 13, by means of a starting crank applied at the end 13ᶜ of said main shaft.

It is to be understood that during the actual operation of the engine as here shown and described, the pistons 22 and 22′ have a uniform, continuous, rotating movement forwardly, no matter at what speed, and also that the crank shaft carrying member 48, the fly wheels 53 and 54, crank shafts 46ª and 47ª, and gears 49, 50, 51 and 52 are also turning with said shaft at a uniform speed forwardly. Attention is also called to the fact that the fly wheels 53 and 54, in addition to having their weight effective in the bodily movement around the main shaft 13, as described, also have their weight effective in their rotation about their individual axes at a higher rate of speed, which is twice the speed of their bodily travel. All of this weight, revolving with the main shaft 13, as just described, operates to control and maintain a uniform continuous, rotating movement forwardly of the main shaft.

It is also to be understood that pistons 24 and 24′, carried by the sleeve 26, connected with the cross slide member 43, which is connected with the cranks 46 and 47, have a varying, continuous speed forward, but no backward movement. In other words, these pistons 24 and 24′ and said cross slide member 43, are being positively moved forwardly by the gear connections at the time of the explosion.

I will now describe the regular operation of the engine as here shown and described, referring especially to the diagrammatic views in Figs. 11 to 17 inclusive.

In Fig. 11, the chamber between pistons 24′ and 22′ will be seen to be in register with an auxiliary exhaust port 5, and the air supply inlet 6, and in position for a blast of air therethrough, which effectively forces out all burnt gases and fills said chamber with pure air as it advances and increases in volume, to the gas intake port 2ª, as indicated in Fig. 12. At this point piston 22′ has cut off the auxiliary exhaust port, and also the air supply port 6, and piston 24′ is just about to uncover gas intake port 2ª. As said piston 24′ moves across said gas intake port 2ª, and to the position shown in Fig. 13, a charge of gas mixture has been taken into said chamber, which has been increased to its maximum volume, and piston 22′ has closed said intake port, as shown. As said pistons continue their movement to the positions shown in Fig. 14, said chamber is reduced to its minimum volume and said mixture has been compressed, at which time the sparks occur, two spark plugs S, S, being shown at opposite sides of the cylinder casing, Fig. 1, and the explosion takes place. The force of the explosion acting on the pistons, results in expanding said chambers, causing the continued, forward movement of said pistons to a position of complete expansion, as shown in Fig. 15. The continued forward movement of said pistons uncover said exhaust port 3ª, and the exhaust begins and continues while the pistons are traveling from the positions shown in Fig. 15, to the positions shown in Fig. 16. In this position exhaust port 3ª is covered by piston 22′, although the complete exhaust has not been accomplished. The continued forward movement of said pistons uncovers the auxiliary exhaust, 5, through which a further exhaust takes place until said chamber is brought into register with the air supply port 6, whereupon an air scavenging action takes place by the admission of air under pressure from said air supply port 6. As said pistons advance beyond this position, the volume of said chamber is reduced to the minimum, as shown in Fig. 11. This completes the full cycle. It will be understood that this same action takes place between each pair of pistons during their travel through a complete revolution. Thus we have four explosions per revolution of the engine.

Having described the piston action, I will now describe the operation of the mechanical connections between the pistons which makes possible this action. As before stated, I have referred to the pistons which are secured to the main shaft 13 and which move therewith in a uniform, continuous forward movement, as the "uniform" piston and to the other pistons, which are secured to the sleeve 26 and turn with the cross slide member 43, as the "varying" piston. It is to be understood that the expansion and contraction of the functioning chambers between any two pistons, as above referred to, is accomplished by the alternately accelerated and retarded speeds of the varying piston relative to the speed of the uniform piston. This accelerated and retarded movement is accomplished by the crank and gear connections in the embodiment of my invention here shown for illustrative purposes. The operation of this mechanical connection is as follows:

Referring again to the diagrammatic views in Figs. 11 to 17, piston 22' is the uniform piston, and piston 24' is the varying piston, in this view. Considering that the uniform piston 22' and the main shaft 13, in Fig. 11, are moving forwardly in the direction indicated by the outer arrows, carrying the crank shaft bearing member 48, with the gear 51, in mesh with the fixed hub gear 20, and crank shaft gear 49 meshing with gear 51, it will be seen that the rotation of these members about said fixed gear 20, will cause the rotation of the crank shaft about its axis in the direction indicated by its arrow. This rotation of said crank shaft, by reason of its connection with the cross slide member 43, will impart to said cross slide member an oscillating movement about the axis of said shaft 13, and across the axis of crank shaft 46ª. This oscillating movement of said cross slide member 43, takes place while all of the moving parts are traveling around the axis of the main shaft 13, as before referred to, resulting in the accelerated and retarded movement of the varying piston. The accelerated movement of the varying piston occurs while the crank 46 is traveling from a position of perpendicular relationship with cross slide member 43, indicated by line P, as shown in Fig. 11, through the inner portion of its arc of travel, or that portion thereof nearest the main shaft 13, to the opposite position of perpendicular relationship of crank 46 to cross slide member 43, as indicated by line P', Fig. 13, and which position has just been passed in said figure. At this position, P', the retarded movement of said varying piston begins, and continues during the travel of said crank through the portion of its arc furthest from the main shaft 13, and until it again reaches the position of perpendicular relationship to said cross slide member 43, as indicated by line P'', Fig. 14, which position has just been passed in said view, thus completing the retarded movement of varying piston 24', as here shown.

Attention is called to the fact that the travel of the crank 46 from position P, Fig. 11, to position P', Fig. 13, produces the accelerated movement of the varying piston, which is less than 180 degrees of angular travel of the crank, and that the travel of said crank 46 from the position P', Fig. 13, to the position P'', Fig. 14, produces the retarded movement of the varying piston, and is greater than 180 degrees.

Attention is also called to the fact that by reason of the relative sizes of the crank shaft gears 49 and 50, and the fixed gear 20, which is the ratio of diameters of 1 to 2, the crank shaft has a rotative speed double that of the main shaft 13. It therefore makes two revolutions about its axis while making one bodily revolution about the main shaft 13.

It is to be understood, of course, that there are two uniform pistons, moving together, and two varying pistons moving together, and that there are, therefore, two chambers diametrically opposite each other which are being simultaneously expanded, and two diametrically opposite chambers which are being simultaneously contracted. While one chamber is expanding under explosion, the diametrically opposite chamber is expanding during intake, and while one chamber is contracted for compression, the diametrically opposite chamber is contracted for exhaust.

Attention is also called to the fact that by providing pistons of considerable surface area, I have been able to also provide inlet and exhaust port openings of comparatively large area, as they can be easily covered by the opposite sides of the pistons. There is also opportunity for varying the form of these openings and their location.

While I have shown and described one practical form or embodiment of my improved rotary engine, I am aware that many changes and adaptations can be made therein as here shown, without departing from the spirit thereof, and I do not, therefore, limit my invention to the embodiment here shown and described, except as I may be limited by the hereto appended claims.

I claim:

1. In a rotary combustion engine, a cylinder casing, a main shaft therein, pistons therein secured to said main shaft, pistons therein provided with a sleeve upon said shaft, and operating connections between said shaft and said sleeve comprising a lever connected with said shaft, a lever connected with said sleeve, a crank shaft carried by the former lever and operatively connected with the latter lever by means of a sliding member, a crank shaft gear and a fixed gear operatively connected, whereby to cause relative rotative movements of said sleeve and said shaft.

2. In an internal combustion engine, a stationary piston casing, two sets of pistons to rotate therein, and operating connections therebetween comprising in combination, a lever having connections with one set of pistons, a crank shaft, and a slide member between said crank shaft and said lever, means for carrying said crank shaft connected with the other set of pistons, and movable and fixed gear means having connection with said crank shaft, whereby to cause the continuous rotation of both sets of pistons.

3. In an engine, a stationary piston casing, a main shaft, two sets of pistons therein, and operating connections therebetween comprising a crank shaft, supporting means on said main shaft for said crank shaft, a lever connected with one set of said pistons, a slide member between the crank of said crank shaft and said lever, and a fixed gear, a crank shaft gear and an intermediate gear in mesh with each other, whereby to cause a rotation of the crank shaft in a direction opposite to that of the pistons and a continuous variable rotative movement of said pistons.

4. In an engine, a piston casing, a main shaft therein, two sets of pistons therein to turn about a common axis with said shaft, and operating connections between said pistons comprising in combination with said main shaft, a crank shaft, a balance wheel on said crank shaft, revolving means for carrying said crank shaft and said balance wheel about said main shaft, intermeshing fixed and movable and intermediate gears, a slide member carried by the crank of said crank shaft, revolving means connected with said slide member and also connected to turn with one set of said pistons, the other set of pistons being connected with the main shaft, whereby a continuous, varying rotative movement is caused in said pistons.

5. In an internal combustion engine, a piston casing, pistons mounted to rotate therein, a crank and crank shaft, means connecting one of said pistons with said crank shaft, means connecting the other of said pistons with the crank of said shaft, a fixed gear, a gear on the crank shaft, and an intermediate gear connecting the crank shaft gear and the fixed gear, whereby to cause a rotative movement of said crank and crank shaft in a direction opposite to the direction of rotation of the pistons.

6. In an internal combustion engine, a piston casing, pistons mounted to rotate therein, a crank and crank shaft, means connecting one of said pistons with said crank shaft, means connecting the other of said pistons with the crank of said shaft, a fixed gear, a gear on the crank shaft, an intermediate gear connecting the crank shaft gear and the fixed gear, to cause a rotative movement of said crank and crank shaft in a direction opposite to the direction of rotation of the pistons, and a fly wheel on said crank shaft for causing a uniform, continuous rotative movement of the piston connected with said crank shaft.

7. In an internal combustion engine, a piston casing, pistons mounted to rotate therein, a crank and crank shaft supported to revolve bodily about the axis of said pistons, means connecting one of said pistons with said crank shaft to revolve it bodily therewith, means connecting the other of said pistons with the crank of said crank shaft, a fixed gear, a gear on the crank shaft, and an intermediate gear connecting the crank shaft gear and the fixed gear, whereby to cause a rotative movement of said crank and crank shaft in a direction opposite to the direction of rotation of the pistons, substantially as described.

8. In an internal combustion engine, a piston casing, pistons mounted to rotate therein, a crank and crank shaft supported to revolve bodily about the axis of said pistons, means connecting one of said pistons with said crank shaft to revolve it bodily therewith, means connecting the other of said pistons with the crank of said shaft, a fixed gear, a gear on the crank shaft, an intermediate gear connecting the crank shaft gear and the fixed gear, whereby to cause a rotative movement of said crank and crank shaft in a direction opposite to the direction of rotation of the pistons, and a fly wheel on said crank shaft for causing a uniform, continuous rotative movement of the piston connected with said crank shaft.

9. In an engine, a piston casing, a shaft therein, two sets of pistons therein to turn about a common axis with said shaft, and operating connections between said pistons for causing a continuous varying rotation thereof, and comprising in combination a crank shaft, a gear thereon, a fixed gear, and interposed gear connecting means between said fixed gear and the gear on said crank shaft, a slide member connected with the crank of said crank shaft connecting means from one set of pistons to said slide member, and connecting means from the other set of pistons to said crank shaft.

10. In an internal combustion engine, in combination with a piston casing and pistons therein, of means for forcing a fluid transversely through said casing and across the path of the pistons, whereby to force out the contents of the exhaust chamber thereof prior to the intake action in said chamber.

11. In an internal combustion engine, a cylinder casing, pistons rotatively mounted therein, means for blowing air transversely through said casing across the path of travel of the pistons, controlled by the pistons, and means whereby air is forced across the chamber formed between pistons as the chamber crosses said air passage.

12. In a combustion engine, a piston casing having oppositely disposed ports through its sides, a piston mounted therein, and means for blowing air through said piston casing, through said ports and across the piston head.

13. In a combustion engine, a piston casing, a plurality of pistons rotatively mounted therein, and forming chambers therebetween, and means for automatically and forcibly scavenging said chambers with a blast of air therethrough and supplying pure air to said chambers as they pass from the exhaust stage to the intake stage.

14. In a rotary combustion engine, a cylinder casing, a crank casing, a plurality of pistons rotatively mounted in said cylinder casing, a crank and crank shaft in said crank casing, a main shaft, a crank shaft carrying member mounted on said main shaft in said crank casing, a cross head slide member carried by said main shaft and connected with said crank, a sleeve on said main shaft and connected with some of said pistons, the other pistons being connected with the main shaft, and gear connections between the crank shaft and a fixed gear, a fixed gear about which said gear connections revolve, and means for scavenging said cylinder casing with air during the rotation of said pistons, substantially as described.

15. In a rotary combustion engine, a cylinder casing, a crank casing, a shaft therethrough, a sleeve on said shaft, pistons secured to said shaft, pistons secured to said sleeve, a crank shaft carrying member on said shaft, a crank shaft carried thereby, a cross head slide member on said sleeve, a slide member connecting said crank with said cross head slide member, a fixed gear held against rotation, a gear on said crank shaft, an intermediate gear connecting said crank shaft gear and said stationary gear, a fly wheel on said crank shaft, air circulating means, and means for circulating air through said cylinder casing.

16. In a rotary engine, a cylinder casing, a crank casing, a main shaft extending through said casings, a crank and crank shaft in said crank casing, a balance wheel on said crank shaft, a plurality of pistons rotatively mounted in said cylinder casing, a crank shaft carrying member mounted on said main shaft in said crank casing, a cross head slide member mounted on said main shaft and connected with said crank, a sleeve on said main shaft connected with some of said pistons, and also connected at its opposite end with said cross head slide member, the other pistons being connected with the main shaft, a fixed stationary gear, and gear connections between said crank shaft and said fixed stationary gear 17. In a rotary internal combustion engine, a piston casing, a crank casing, a main shaft extending through said casings, pistons mounted on said shaft in said piston casing, a sleeve on said main shaft, pistons mounted on said sleeve in said piston casing, a crank shaft carrying member mounted on said main shaft in said crank casing, a crank shaft and crank carried in said crank shaft carrying member, a cross head slide member connected with said sleeve in said crank casing, a slide bearing member in said cross head slide member and connected with said crank, a fly wheel on said crank shaft, a fixed stationary gear, gear connections from said crank shaft to said fixed stationary gear, whereby said crank shaft carrying member and said crank shaft and fly wheel are revolved together around the main shaft and said crank shaft is rotated about its own axis, and means for passing air through said piston casing, between said pistons, substantially as shown and described.

Signed at Portland, Multnomah County, Oregon, this 7th day of June, 1918.

FRANK A. BULLINGTON.

In presence of:—
FRANK H. HILTON,
WILLIAM R. LITZENBERG.